(12) United States Patent
Liu et al.

(10) Patent No.: US 8,249,330 B2
(45) Date of Patent: Aug. 21, 2012

(54) SYSTEM AND METHOD FOR TESTING A LIQUID CRYSTAL PANEL

(75) Inventors: Chang-Chun Liu, Shenzhen (CN); Guo-Fu Guo, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 978 days.

(21) Appl. No.: 12/253,245

(22) Filed: Oct. 17, 2008

(65) Prior Publication Data
US 2009/0167341 A1   Jul. 2, 2009

(30) Foreign Application Priority Data
Dec. 27, 2007   (CN) .......................... 2007 1 0203472

(51) Int. Cl.
*G06K 9/00*   (2006.01)

(52) U.S. Cl. ..................... 382/141; 324/760.01; 349/17; 349/158; 349/192; 382/190

(58) Field of Classification Search .................. 382/141, 382/152, 190; 324/760.01; 345/173; 349/17, 349/158, 192
See application file for complete search history.

(56) References Cited

U.S. PATENT DOCUMENTS

| | | | | |
|---|---|---|---|---|
| 5,617,228 A * | 4/1997 | Watanabe et al. | ............... | 349/19 |
| 5,991,002 A * | 11/1999 | Kato et al. | ................... | 349/192 |
| 6,285,435 B1 * | 9/2001 | Inoue et al. | ................... | 349/189 |
| 6,825,910 B2 * | 11/2004 | Aoki et al. | .................... | 349/190 |
| 7,453,545 B2 * | 11/2008 | Kim et al. | ..................... | 349/155 |
| 7,683,980 B2 * | 3/2010 | Ohta et al. | ....................... | 349/60 |
| 7,701,546 B2 * | 4/2010 | Yu et al. | ........................ | 349/187 |
| 7,746,446 B2 * | 6/2010 | Okita | ............................. | 355/53 |
| 8,039,807 B2 * | 10/2011 | Tanitsu | ................... | 250/370.01 |

FOREIGN PATENT DOCUMENTS
JP    2006-275547    10/2006

* cited by examiner

*Primary Examiner* — Gregory M Desire
(74) *Attorney, Agent, or Firm* — Altis Law Group, Inc.

(57) ABSTRACT

A method for testing a liquid crystal panel is provided. The method simulates an outside force endured by the liquid crystal panel when the liquid crystal panel is assembled as a finished product, so that unqualified liquid crystal panels can be detected before the finished product is put into use.

18 Claims, 3 Drawing Sheets

SYSTEM AND METHOD FOR TESTING A LIQUID CRYSTAL PANEL

BACKGROUND

1. Field of the Invention

Embodiments of the present disclosure relate to systems and methods for testing liquid crystal products, and particularly to a system and method for testing a liquid crystal panel.

2. Description of Related Art

Generally, a liquid crystal panel includes a thin film transistor substrate and a color filter substrate disposed opposite to each other and spaced apart a predetermined distance. A liquid crystal layer is located between the thin film transistor substrate and the color filter substrate. The thin film transistor substrate includes a gate electrode, a gate insulating film, a semiconductor layer, a source electrode, a drain electrode, a passivation layer, and a pixel electrode formed on a glass substrate in sequence. The color filter substrate includes a color filter layer, and an opposite transparent electrode formed on another glass substrate in sequence.

Because manufacture processes of the above two glass substrates are very difficult, unwanted particulates, such as glass particulates or metal particulates, are easy to exist on the two glass substrates. Before the liquid crystal panel is assembled with other parts to form a liquid crystal product, e.g., a televisions or a mobile phone, because no outside force is given to the two glass substrates, it's difficult to know disadvantage brought by the unwanted particulates. However, when the liquid crystal panel is assembled, the predetermined distance is reduced due to outside force given to the two glass substrates by the mechanism parts, the unwanted particulates may cause a short circuit connection between the electrodes on the two glass substrates when the liquid crystal product is electrified. As a result, abnormalities such as black lines, or intersection lines, occur on the liquid crystal product.

However, at present, test methods of the liquid crystal panels ignore the outside force endured by the crystal panels when assembled, so unqualified liquid crystal panels are found until a final product is put into use.

What is needed, therefore, is a system and method for testing liquid crystal panels, so as to detect unqualified liquid crystal panels before the liquid crystal panels are assembled as final products.

SUMMARY

A method for testing a liquid crystal panel is provided. The method applies a pressure adjusting device to adjust a pressure imposed to the liquid crystal panel via a pressure plate. The method further applies the computer to run a test unit configured for setting a plurality of parameters to control the pressure adjusting device, displaying one or more images on the liquid crystal panel, and checking if the liquid crystal panel is qualified by checking if any abnormality occurs on the one or more images when different pressure are imposed to the liquid crystal panel.

Other objects, advantages and novel features will become more apparent from the following detailed description of certain embodiments of the present disclosure when taken in conjunction with the accompanying drawings.

DETAILED DESCRIPTION OF CERTAIN INVENTIVE EMBODIMENTS

All of the processes described below may be embodied in, and fully automated via, function modules executed by one or more general purpose processors. The function modules may be stored in any type of electron-readable medium or other storage device. Some or all of the methods may alternatively be embodied in specialized computer hardware.

Figure 1:
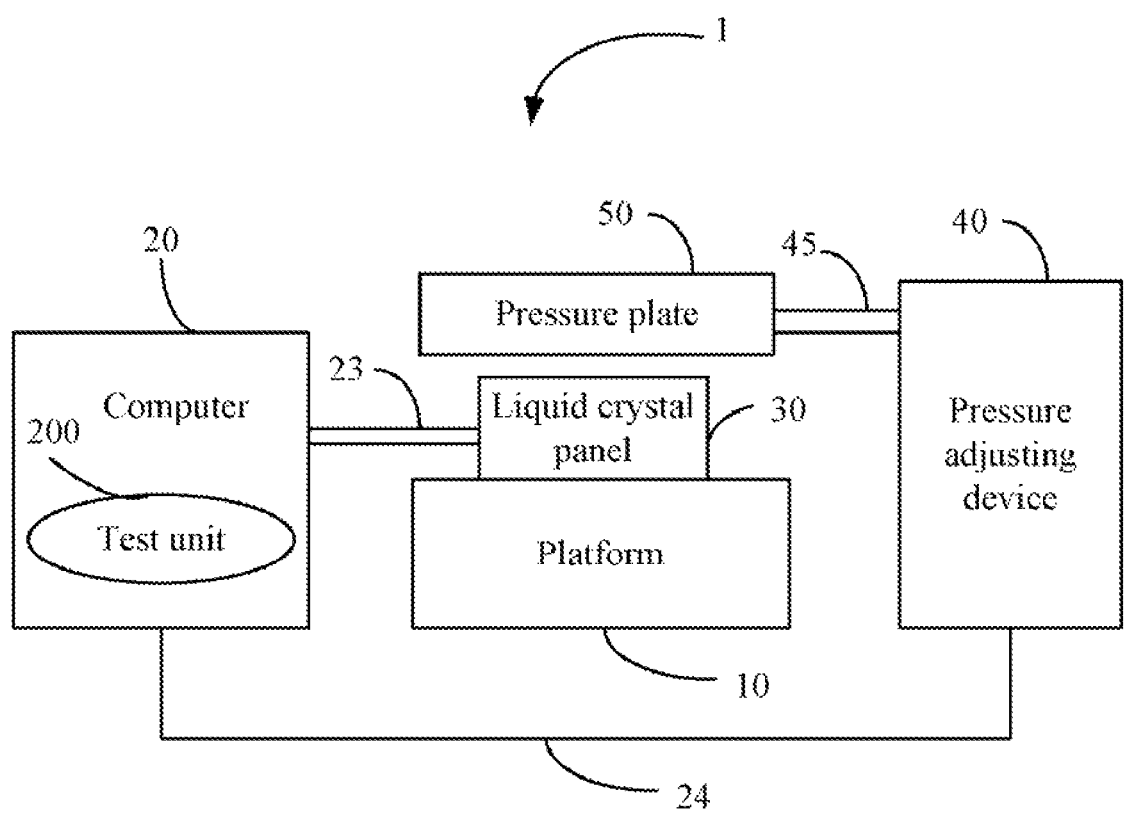
FIG. 1 is a block diagram of one embodiment of a system for testing a liquid crystal panel.

FIG. 1 is a block diagram of one embodiment of a system 1 for testing a liquid crystal panel. The system 1 comprises a platform 10, a computer 20, a liquid crystal panel 30, a pressure adjusting device 40, and a pressure plate 50. The liquid crystal panel 30 is located on the platform 10.

The computer 20 is connected with the liquid crystal panel 30 via a data bus 23, and is connected with the pressure adjusting device 40 via a control bus 24. The computer 20 comprises a test unit 200, which is configured for controlling the pressure adjusting device 40 to impose a pressure onto the liquid crystal panel 30, displaying one or more images on the liquid crystal panel 30 when different pressures are imposed to the liquid crystal panel 30, and for determining if the liquid crystal panel 30 is qualified by checking if any abnormalities occur on the one or more images.

The pressure adjusting device 40 is connected with the pressure plate 50 via a connection part 45. The pressure adjusting device 40 adjusts the pressure to the liquid crystal panel 30 via the pressure plate 50.

In one embodiment, the pressure adjusting device 40 may be a mechanical press, or any other pressure sources, such as an air driven press. The pressure plate 50 may be a transparent acrylic sheet, so that the one or more images displayed on the liquid crystal panel 30 can be viewed through the pressure plate 50.

Figure 2:
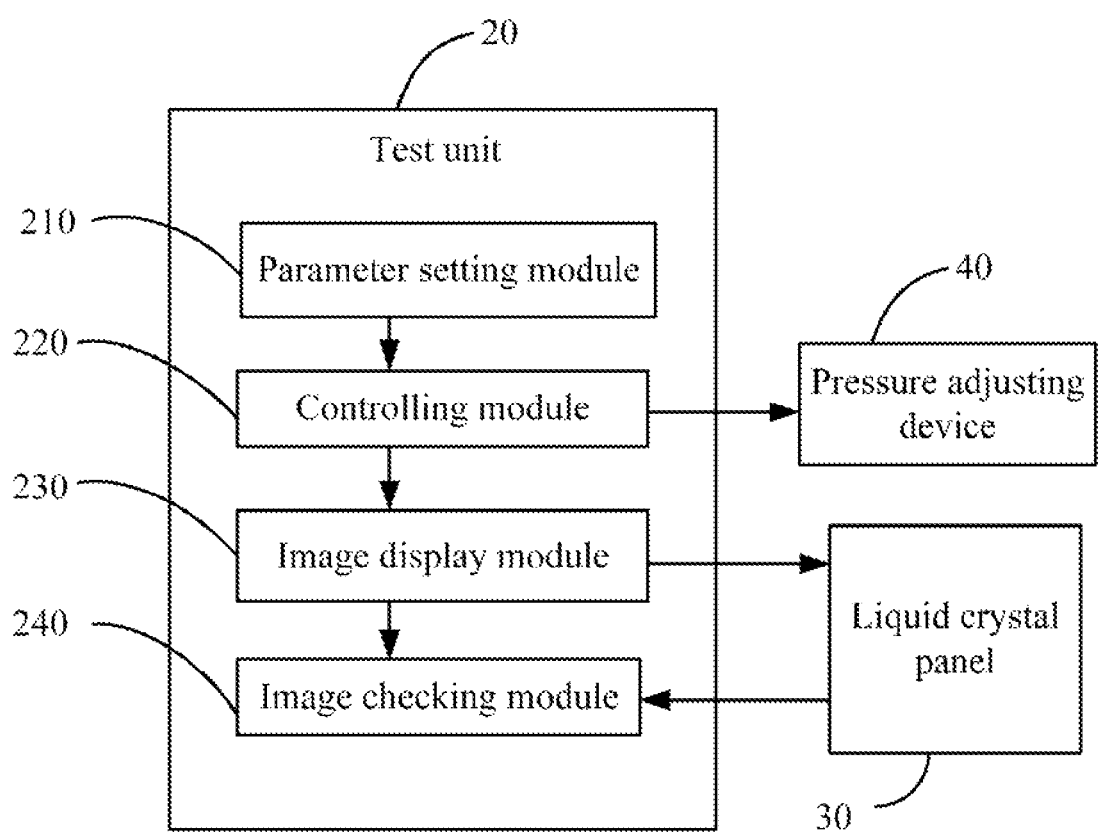
FIG. 2 is a block diagram of one embodiment of a computer in FIG. 1.

FIG. 2 is a block diagram of one embodiment of the test unit 200 in the computer 20. In one embodiment, the test unit 200 comprises a parameter setting module 210, a controlling module 220, an image display module 230, and an image checking module 240. One or more general purpose or specialized processors may execute the modules 200-240 to execute one or more operations of the computer 20.

The parameter setting module 210 is configured for setting a plurality of connection commands, the one or more images to be displayed on the liquid crystal panel 30, and pressure parameters. The connection commands are used for connecting the liquid crystal panel 30 to the computer 20 and connecting the pressure adjusting device 40 to the computer 20. The pressure parameters are used for controlling the pressure adjusting device 40 to impose different pressures onto the liquid crystal panel 30. In one embodiment, the pressure parameters comprise a pressure value and a pressure direction. It may be understood that the pressure value is set according to industry standards of liquid crystal panels, such as materials, dimensions, and quality of the liquid crystal panel 30. In one embodiment, the pressure value may be less than or equal to a maximal endurable pressure value (for example, "10 kg force") of the liquid crystal panel 30. The pressure direction is vertical to the liquid crystal panel. Depending on embodiment, the pressure adjusting device 40 controls the pressure plate 50 to impose the pressure to the liquid crystal panel 30 in a vertical direction.

The controlling module 220 is configured for controlling the pressure adjusting device 40 to adjust the pressure plate 50 to impose the pressure on the liquid crystal panel 30 according to the pressure parameters. In one embodiment, the pressure controlling module 220 may control the pressure adjusting device 40 to gradually increase the pressure on the liquid crystal panel 30 via the pressure plate 50, such as from zero to a preset value. In other embodiments, the controlling module 220 may control the pressure adjusting device 40 to directly impose the pressure with the preset value to the liquid crystal panel 30.

The image displaying module 230 is configured for displaying the one or more images on the liquid crystal panel 30 when different pressures are imposed to the liquid crystal panel 30.

The image checking module 240 is configured for checking if any abnormality occurs on the one or more images to determine if the liquid crystal panel 30 is qualified. In the embodiment, if no black lines and no intersection lines appear in the one or more images when the pressure is imposed to the liquid crystal panel 30, the image checking module 240 determines that the liquid crystal panel 30 is qualified. Otherwise, if one or more black lines or intersection lines appear in the one or more images, the image checking module 240 determines that the liquid crystal panel 30 is unqualified. The image checking module 240 is further configured for generating a test report of the liquid crystal panel 30 according to the determination.

Figure 3:
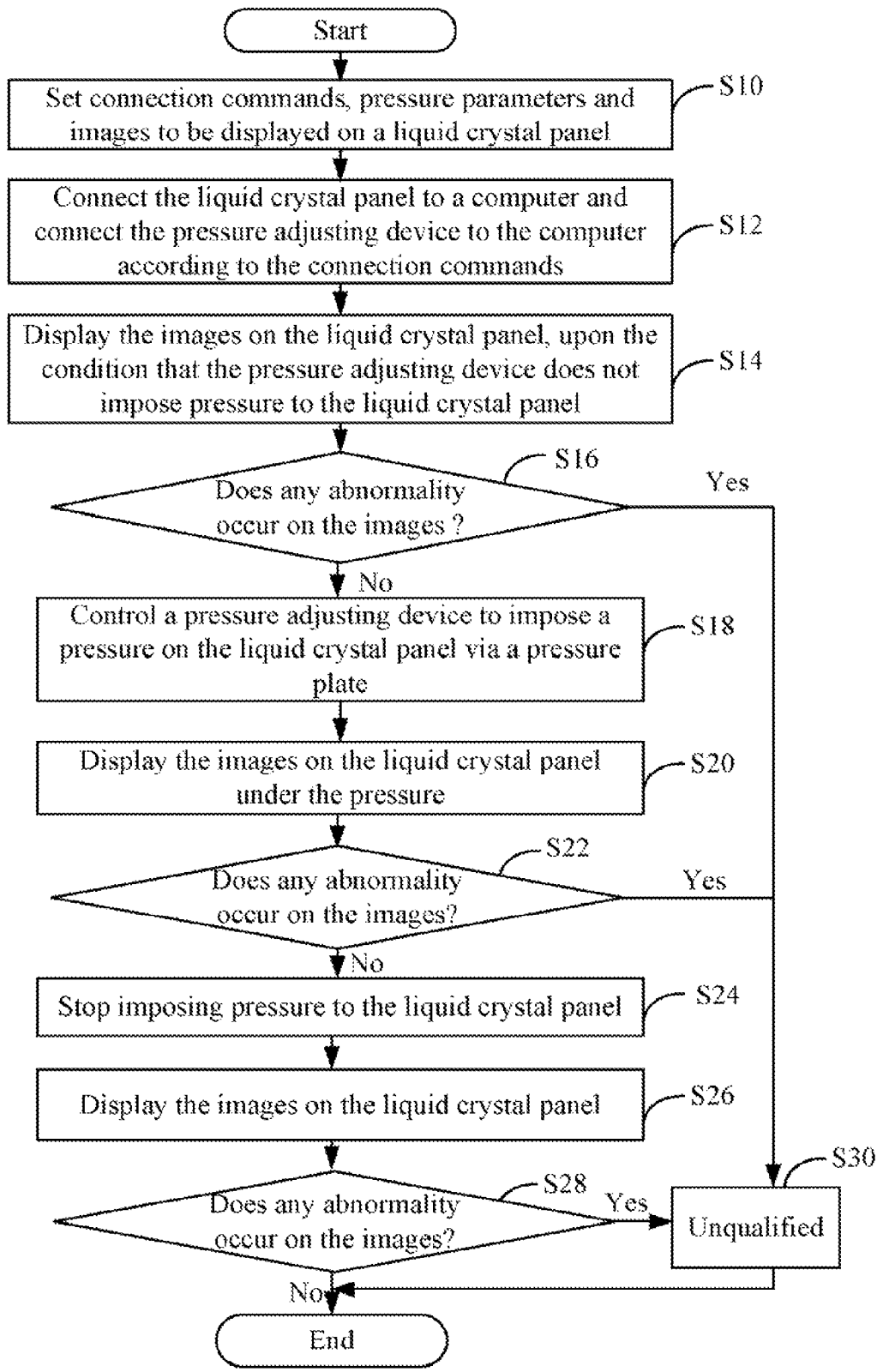
FIG. 3 is a flowchart of one embodiment of a method for testing a liquid crystal panel.

FIG. 3 is a flowchart of one embodiment of an implementation method of testing the liquid crystal panel 30. Depending on the embodiment, additional blocks may be added, others removed, and the ordering of the blocks may be changed.

In block S10, the parameter setting module 210 sets a plurality of connection commands, pressure parameters, and one or more images to be displayed on the liquid crystal panel 30. As mentioned above, the pressure parameters comprise a pressure value and a pressure direction. Depending on the embodiment, the pressure value may be set according to industry standards of liquid crystal panels, such as materials, dimensions, and quality of the liquid crystal panel 30. The pressure value may be more than zero, but less than or equal to a maximal endurable pressure value (for example, "10 kg force") of the liquid crystal panel 30. The pressure direction is vertical to the liquid crystal panel.

In block S12, the controlling module 220 connects the liquid crystal panel 30 with the computer 20, and connects the pressure adjusting device 40 with the computer 20 according to the connection commands.

In block S14, the parameter setting module 210 sets a pressure value and a pressure direction imposed by the pressure plate 50 to zero, so that the pressure plate 50 imposes no pressure to the liquid crystal panel 30. The image displaying module 230 displays the one or more images on the liquid crystal panel 30, upon the condition that the pressure plate 50 does not impose any pressure to the liquid crystal panel 30.

In block S16, the image checking module 240 checks if any abnormality, e.g., a black line, or an intersection line, occurs on the one or more images. If any abnormality occurs on the one or more images, the procedure goes to block S30, the image checking module 240 determines that the liquid crystal panel 30 is unqualified. If no abnormality occurs on the one or more images, the procedure goes to block S18 as described below.

In block S18, the controlling module 220 controls the pressure adjusting device 40 to adjust the pressure plate 50 to impose the pressure on the liquid crystal panel 30 according to the pressure parameters. Depending on the embodiment, the pressure adjusting device 40 controls the pressure plate 50 to impose the pressure on the liquid crystal panel 30 in a vertical direction.

In block S20, the image display module 230 displays the one or more images on the liquid crystal panel 30 upon the condition that the pressure adjusting device 40 imposes different pressures on the liquid crystal panel 30 via the pressure plate 50.

In block S22, the image checking module 240 checks if any abnormality, e.g., a black line, or an intersection line, occurs on the one or more images. If any abnormality occurs on the one or more images, the procedure goes to block S30 describe above. If no abnormality occurs on the one or more images, the image checking module 240 determines that the liquid crystal panel 30 works normally under the different pressure. However, to ensure that the pressure does not bring bad influence to the liquid crystal panel 30, the procedure goes to block S24 described below. Depending on the embodiment, the blocks S24, S26, and S28 can be removed.

In block S24, the controlling module 220 controls the pressure adjusting device 40 to stop imposing pressure on the pressure plate 50, so that the pressure plate 50 stops imposing pressure to the liquid crystal panel 30.

In block S26, the image display module 230 displays the one or more images on the liquid crystal panel 30 upon the condition that the pressure adjusting device 40 stops imposing the pressure on the liquid crystal panel 30.

In block S28, the image checking module 240 checks if any abnormality, e.g., a black line, or an intersection line, occurs on the one or more images. If any abnormality occurs on the one or more images, the procedure goes to block S30 describe above. If no abnormality occurs on the one or more images, the image checking module 240 determines that that the liquid crystal panel 30 is qualified. Additionally, the image checking module 240 generates a test report of the liquid crystal panel 30 according to the determination.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A method for testing a liquid crystal panel, the method comprising:
   setting a plurality of connection commands, pressure parameters, and one or more images to be displayed on the liquid crystal panel;
   connecting the liquid crystal panel to a computer and connecting the computer to a pressure adjusting device according to the plurality of connection commands;
   displaying the one or more images on the liquid crystal panel upon the condition that the pressure adjusting device does not impose any pressure to the liquid crystal panel, and checking if any abnormality occurs in the one or more images;
   in response to any abnormality occurs in the one or more images, determining that the liquid crystal panel is unqualified, otherwise, in response to no abnormality occurs in the one or more images, controlling the pressure adjusting device to impose different pressures to the liquid crystal panel according to the pressure parameters, and displaying the one or more images on the liquid crystal panel and checking if any abnormality occurs in the one or more images;

in response to any abnormality occurs in the one or more images, determining that the liquid crystal panel is unqualified, otherwise, in response to no abnormality occurs in the one or more images, determining that the liquid crystal panel works normally under the pressure; and generating and displaying a test report of the liquid crystal panel according to the determination results.

2. The method of claim 1, further comprising:

removing the pressure plate to stop imposing the pressure to the liquid crystal device, displaying the one or more images on the liquid crystal panel and checking if any abnormality occurs in the one or more images upon the condition that the pressure adjusting device stops imposing the pressure to the liquid crystal panel; and in response to any abnormality occurs in the one or more images, determining that the liquid crystal panel is unqualified, otherwise, in response to no abnormality occurs in the one or more images, determining that the liquid crystal panel is qualified.

3. The method of claim 1, wherein the pressure parameters comprise a pressure value and a pressure direction.

4. The method of claim 3, wherein the pressure value is less than or equal to a maximal endurable pressure of the liquid crystal panel.

5. The method of claim 3, wherein the pressure direction is vertical to the liquid crystal panel.

6. A system for testing a liquid crystal panel, the system comprising:

a pressure plate for imposing a selected pressure to the liquid crystal panel;

a pressure adjusting device for adjusting the selected pressure imposed to the liquid crystal panel via the pressure plate; and a computer connected to the pressure adjusting device, the computer comprising a test unit, wherein the test unit comprises:

a parameter setting module configured for setting a plurality of connection commands, pressure parameters, and the one or more images displayed on the liquid crystal panel;

a controlling module configured for connecting the liquid crystal panel to a computer, connecting the pressure adjusting device to the computer according to the connection commands, and controlling the pressure adjusting device to adjust the selected pressure imposed on the liquid crystal panel according to the pressure parameters;

an image display module configured for displaying the one or more images on the liquid crystal panel when different pressures are imposed to the liquid crystal panel; and an image checking module for checking if any abnormality occurs on the one or more images to determine if the liquid crystal panel is qualified, and generating a test report of the liquid crystal panel according to the determination result.

7. The system of claim 6, wherein the pressure parameters comprise a pressure value and a pressure direction.

8. The system of claim 7, wherein the pressure value is less than or equal to a maximal endurable pressure of the liquid crystal panel.

9. The system of claim 7, wherein the pressure direction is vertical to the liquid crystal panel.

10. The system of claim 7, wherein the controlling module controls the pressure adjusting device to gradually increase the selected pressure on the liquid crystal panel to the pressure value.

11. The system of claim 7, wherein the pressure controlling module controls the pressure adjusting device to directly impose the selected pressure with the pressure value on the liquid crystal panel.

12. The system of claim 6, wherein the pressure plate is an acrylic sheet.

13. The system of claim 6, wherein the pressure adjusting device is either a mechanical press or an air driven press.

14. A computer-readable medium having stored thereon instructions, the set of instructions capable of being executed by a processor to perform a method for testing a liquid crystal panel, the method comprising:

setting a plurality of connection commands, pressure parameters, and one or more images to be displayed on the liquid crystal panel;

connecting the liquid crystal panel to a computer and connecting the computer to a pressure adjusting device according to the plurality of connection commands;

displaying the one or more images on the liquid crystal panel upon the condition that the pressure adjusting device does not impose any pressure to the liquid crystal panel, and checking if any abnormality occurs in the one or more images;

in response to any abnormality occurs in the one or more images, determining that the liquid crystal panel is unqualified, otherwise, in response to no abnormality occurs in the one or more images, controlling the pressure adjusting device to impose different pressures to the liquid crystal panel according to the pressure parameters, and displaying the one or more images on the liquid crystal panel and checking if any abnormality occurs in the one or more images;

in response to any abnormality occurs in the one or more images, determining that the liquid crystal panel is unqualified, otherwise, in response to no abnormality occurs, determining that the liquid crystal panel works normally under the pressure; and generating and displaying a test report of the liquid crystal panel according to the determination results.

15. The computer-readable medium of claim 14, the method further comprising:

removing the pressure plate to stop imposing the pressure to the liquid crystal device, displaying the one or more images on the liquid crystal panel and checking if any abnormality occurs in the one or more images upon the condition that the pressure adjusting device stops imposing the pressure to the liquid crystal panel; and in response to any abnormality occurs in the one or more images, determining that the liquid crystal panel is unqualified, otherwise, in response to no abnormality occurs, determining that the liquid crystal panel is qualified.

16. The computer-readable medium of claim 14, wherein the pressure parameters comprise a pressure value and a pressure direction.

17. The computer-readable medium of claim 16, wherein the pressure value is less than or equal to a maximal endurable pressure of the liquid crystal panel.

18. The computer-readable medium of claim 16, wherein the pressure direction is vertical to the liquid crystal panel.

* * * * *